US006899139B2

(12) United States Patent
Normanni

(10) Patent No.: US 6,899,139 B2
(45) Date of Patent: May 31, 2005

(54) TUBE FOR PUMPING A SPACE BETWEEN TWO TILES, ESPECIALLY FOR A PLASMA DISPLAY

(75) Inventor: Alain Normanni, Seyssins (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 337 days.

(21) Appl. No.: 10/262,815

(22) Filed: Oct. 2, 2002

(65) Prior Publication Data

US 2003/0067366 A1 Apr. 10, 2003

(30) Foreign Application Priority Data

Oct. 10, 2001 (FR) ........................................... 01 13084

(51) Int. Cl.$^{7}$ ............................... F16L 9/00; H05J 9/38

(52) U.S. Cl. ....................... 138/109; 138/155; 138/178; 138/177; 285/911; 285/207; 313/582

(58) Field of Search ................................ 138/109, 177, 138/178, 155; 285/911, 205–209; 313/582, 493, 495

(56) References Cited

U.S. PATENT DOCUMENTS 2,704,169 A * 3/1955 Ishler et al. ................. 220/2.2
3,821,584 A * 6/1974 Scovronek .................. 313/565
3,914,000 A * 10/1975 Beckerman et al. .......... 445/25
4,770,310 A * 9/1988 Morimoto et al. ........... 220/2.2
5,207,607 A * 5/1993 Nagano et al. ............... 445/25
5,897,927 A * 4/1999 Tsai et al. ...................... 428/34
6,313,579 B1 * 11/2001 Nakano et al. ............. 313/493
6,531,818 B1 * 3/2003 Normanni ................... 313/582

FOREIGN PATENT DOCUMENTS

FR 2755041 A1 * 4/1998 .......... B21D/28/26
FR 2796490 1/2001
GB 2261320 5/1993

* cited by examiner

*Primary Examiner*—Patrick Brinson
(74) *Attorney, Agent, or Firm*—Joseph S. Tripoli; Harvey D. Fried; Sammy S. Henig

(57) ABSTRACT

Tube for pumping a space between two tiles, comprising a metal end-piece 9 and a glass tube 25 bonded together via a glass-to-metal seal 26; the metal end-piece 9 has shoulder means 3.

Such a tube is especially intended to be fitted onto plasma displays or field emission displays.

This tube is inexpensive and allows rapid and precise handling and fitting.

13 Claims, 4 Drawing Sheets

TUBE FOR PUMPING A SPACE BETWEEN TWO TILES, ESPECIALLY FOR A PLASMA DISPLAY

FIELD OF THE INVENTION

Referring to FIGS. 1 to 4, the invention relates to a tube 1 for pumping, where appropriate for filling, and for sealing, a space 7 between two flat tiles 4 and 5; this tube 1 comprises a cylindrical pumping pipe 2 one end 21 of which is intended to be fitted into a pumping orifice 6 made in one of the tiles 4 and communicating with the space 7 between the tiles; for this purpose, the outside diameter of the tubular pipe 2 is, at this end 21, less or slightly less than the diameter of the pumping orifice 6; the other end 22 of the tube is intended to be connected to pumping, and where appropriate filling, means; the two flat tiles together form a panel that can be used, for example, for the production of a plasma panel for display or addressing or for the production of a field emission display.

BACKGROUND ART

A plasma display generally comprises two tiles, leaving between them a space filled with a discharge gas, and at least two arrays of electrodes which intersect, these generally being deposited on each of the tiles; by applying a potential difference between an electrode of the first array and an electrode of the second array, a discharge is created in the gas between the tiles at the intersection of these electrodes; this discharge emits ultraviolet radiation which is converted, by the phosphors partially covering the internal surface of the tiles, into visible radiation.

A plasma-addressed liquid-crystal display (PALCD) is generally formed by superposing a plasma addressing panel and a liquid-crystal panel, and also includes at least two arrays of electrodes which intersect; the plasma addressing panel generally comprises, as above, two tiles leaving between them a space filled with a discharge gas; by applying a potential difference between an electrode of the first array and an electrode of the second array, a discharge is created in the gas at the intersection of these electrodes; this discharge is equivalent to the closing of a switch and allows a potential difference to be selectively addressed at the terminals of the liquid-crystal cells located opposite this discharge.

A field emission display (FED) also comprises two tiles leaving between them an empty space intended for the path of electrons emitted by the field-effect cathodes towards the anode; this empty space contains in fact a gas under very low pressure.

All these displays therefore comprise two tiles leaving between them a space containing a gas; the tiles are made of rigid material in order to withstand the difference between the external pressure and the internal pressure; these tiles are generally made of electrically insulating materials; thus, these tiles are generally made of glass, glass-ceramic or ceramic.

With reference to FIG. 3, the manufacture of such displays 10 comprising two tiles 4 and 5, leaving between them a space 7 containing a gas, generally comprises the following steps:

- manufacture of the first tile 4 and second tile 5, one of the tiles, 4, being provided with a pumping orifice 6;
- assembly of the tiles 4, 5, so as to be mutually parallel and separated by a distance sufficient to leave between them a space 7, by applying a sealing compound 61 around the perimeter of the tiles;
- fitting of a pumping and sealing tube 1 into the pumping orifice 6, by applying a sealing compound 62 between the walls of the tube and those of this space around the orifice;
- pumping-out of the gas contained in this sealing space 7 through the pumping tube 1;
- sealing of this space 7 by closing off the pumping tube 1.

The thickness of the space 7 left between the tiles 4 and 5 is in general approximately constant and tailored to the operation of the display 10.

As sealing compounds 61, 62, it is general practice to use a glass sealing compound; it is then necessary to carry out a heat treatment to vitrify this joint, before the pumping step, so as to form seals 61', 62'.

During the pumping step, the display is generally heated in order to facilitate the absorption of the occluded gases in the space between the tiles.

In the specific case of plasma displays, to be able to obtain plasma discharges between the tiles this space must contain a discharge gas, of suitable composition and pressure; the manufacture of the display therefore furthermore includes, after pumping and before sealing, a step of filling the display with the discharge gas through the same tube 1 used previously for the pumping.

To perform these operations, it is particularly important that the pumping tube, as fitted onto the display, be able to withstand the mechanical shear and compressive stresses; this remains true for the rest of the operations for manufacturing the display, since the pumping and sealing tube remains fastened to the display and must be able to withstand accidental impact during subsequent handling.

Such a pumping, sealing and, where appropriate, filling tube 1 is generally called a stem tube.

Document GB 2 261 320 discloses a stem tube provided with metal shoulder means which are intended to bear on the tile around the periphery of the pumping orifice and onto which a glass pipe is fitted in order to connect the pumping means and to seal the display; this pipe does not penetrate the hole in the tile.

So as to be able to easily and rapidly position the pumping tube 1 and, in this case, so as to fit its end 21 into the pumping orifice 6, whatever the clearance between the tube and the orifice (difference in diameters), and so as to facilitate the operation of sealing between this tube and the orifice by means of the seal 62', document FR 2 796 490 discloses a stem tube provided with shoulder means 3 which are intended to bear on the tiles 4 around the periphery of the pumping orifice 6; according to that document, these shoulder means have a plane shoulder surface 31, generally perpendicular to the axis of the tube, intended to bear against the external surface 41 of the tile 4 located around the periphery of the pumping orifice 6, and thus make it easy for the axis of the end 21 of the tubular pipe 2 to be made coincident with the axis of the pumping orifice 6, thereby making it easier to fit the stem tube.

When this shoulder surface 31 extends continuously, radially from the tube and peripherally around the tube, for example when it forms a flat disc as shown in FIG. 1, these shoulder means facilitate the operation of sealing between the walls of the tube and those of the space between the tiles: the sealing compound 62 is then applied directly to this surface 31, as shown in FIG. 2; if the shoulder surface is wide enough, such an embodiment therefore facilitates the sealing operation.

Referring to FIGS. 5 and 6, for the pumping, and where appropriate filling, step, the other, downstream end 22 of the tube 1 is connected to a pumping and filling installation (not shown) via a connection end-piece 8, 8'; the connection may be made, for example, either by bonding in the case of the end-piece 8 of FIG. 5 or by removable connection means 81 in the case of the end-piece 8' of FIG. 6.

There is an advantage in using a glass pipe 2 as it makes the subsequent sealing step easier; this is because, after the pumping, and where appropriate filling, step, all that is then required is to melt the glass of the pipe 2 at the sealing point S in order to seal the space 7 between the tiles; the connection end-piece 8, 8' can then be easily cut off or removed.

However, a glass pumping tube is in general more difficult to position correctly at the orifice 6 by means of automatic machines; this is because the tolerances at the end 21 and at the shoulder 3 on the tile's 4 side may, if the material is glass, pose a problem in positioning it rapidly and effectively.

Moreover, a glass part is always tricky to handle with automatic machines; in the case of a moulded glass pumping tube, like that shown in FIG. 7, this part generally has a conical outer surface 29 in order to facilitate moulding, which makes it even more difficult to handle precisely.

The object of the invention is to mitigate the aforementioned drawbacks.

SUMMARY OF THE INVENTION

For this purpose, one subject of the invention is a tube for pumping, where appropriate for filling, and for sealing a space between two tiles, at least one of which is provided with a pumping orifice, comprising a cylindrical pumping pipe and metal shoulder means for this pipe on the tile, the said cylindrical pipe comprising a metal upstream portion whose part upstream of the shoulder means is intended to be fitted into the said orifice and a glass downstream portion, characterized in that the said upstream metal portion forms with these shoulder means a metal end-piece.

More specifically, the shoulder means comprise a shoulder surface intended to be applied against that external surface of the tile which is located around the periphery of the pumping orifice.

The downstream glass portion of the pipe is intended to be connected to pumping, and where appropriate filling, means; when the tube is fitted onto a sealed display, this glass end corresponds to the sealing region.

Such a pumping tube combines the advantages of ease of sealing, thanks to its downstream glass portion, and ease of precise automatic handling and positioning, thanks to its shoulder means and to its upstream metal part; such a pumping tube is particularly inexpensive.

As the upstream portion of the pipe forms with the shoulder means a metal end-piece, all the metal components of the tube may be produced as a single part, this being particularly inexpensive.

This metal end-piece may be produced by machining or turning.

This metal end-piece may also be produced by punching a hole in at least one metal plate, the hole being made by punching, with the edges of the hole being made to stand up so that these edges form, at least in part, the upstream cylindrical portion of the pipe, at least one metal plate forming the shoulder means.

More specifically, a hole is punched at the centre of a flat sheet-metal disc, the punching itself causing the edges of the hole to stand up; depending on the desired length of the upstream cylindrical portion of the pipe, other punching passes may be necessary in order to accentuate the upstand of the edges of the hole; such a method is described, for example, in document FR 2 755 041.

Such a pierced metal plate then forms a collar; when two collars are used to produce the end-piece, they are superposed "back to back" and the metal plates welded together; the shoulder means are then formed by the two welded metal plates; in this case, the upstream cylindrical portion of the pipe extends upstream and downstream of the shoulder means.

The said metal end-piece may also be produced by drawing at least one metal plate so as to form a hole with upstanding edges, forming, at least in part, the upstream cylindrical portion of the pipe, at least one metal plate forming the shoulder means.

According to one embodiment, the pumping means comprises a metal cylindrical sleeve which extends on each side of the shoulder means, onto which sleeve both the glass downstream portion of the pipe and the circular edges of the hole of at least one metal plate are fitted; a pumping tube having a good shear strength is therefore obtained.

Preferably, the downstream portion of the pipe is joined to the metal upstream portion of this pipe by a glass-to-metal seal.

Preferably, level with the said glass-to-metal seal, the cross section of the cylindrical wall of the upstream portion of the pipe in contact with the glass is chamfered; this chamfer in the thickness of the cylindrical wall means for example that the end of the cylinder is not cut with straight edges; advantageously, this chamfer facilitates the glass-to-metal sealing and makes the bond more impact resistant.

When the metal part of the tube is produced by punching or drawing, when the shoulder means comprise a single metal plate onto which a glass end of the downstream portion of the pipe is bonded and when the circular edges of the hole in the metal plate extend upstream of the shoulder means, the said metal plate preferably has a convex circular groove, one of the flanks of which is located level with the glass-to-metal seal, thus forming a chamfer which advantageously facilitates the glass-to-metal sealing and makes the bond more impact resistant; it is recommended to avoid a concave or "recessed" groove which would run the risk of trapping air bubbles when making the glass-to-metal seal.

The subject of the invention is also a display comprising two flat tiles defining between them a space, at least one of which is provided with a pumping orifice into which a pumping tube is fitted according to the invention so that the shoulder surface of this tube is applied against that external surface of the tile which is located around the periphery of the pumping orifice; preferably, this display includes a seal between the shoulder surface and the said external surface; preferably, the said pumping tube is sealed at its glass end.

Depending on the situation, and without any limitation, such a display may be a plasma display, especially for displaying images or for addressing a liquid-crystal display; such a display may also be a field emission display.

BRIEF DESCRIPTION OF THE DRAWINGS

The invention will be more clearly understood from the description which follows, this being given by way of non-limiting example and with reference to the appended figures in which.

DETAILED DESCRIPTION OF EMBODIMENTS OF THE INVENTION

To simplify the description and bring out the differences and advantages that the invention has over the prior state of the art, identical reference numbers will be used for the elements which fulfil the same functions.

Figure 1:
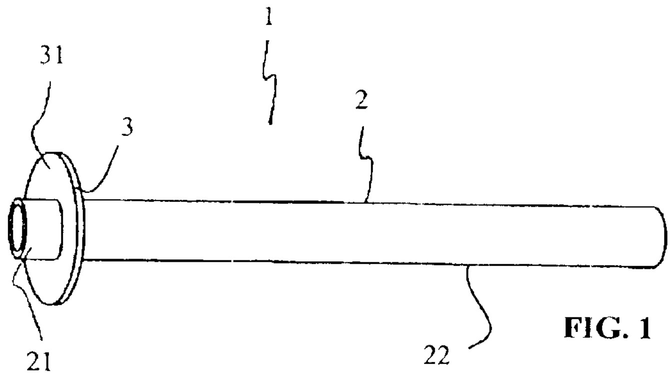
FIG. 1 depicts a pumping tube provided with shoulder means.
Figure 2:
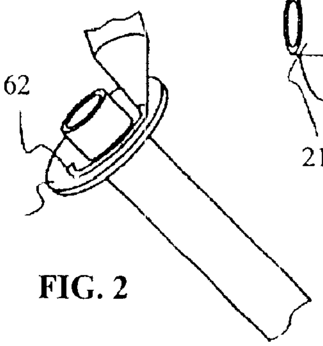
FIG. 2 depicts the application of a sealing compound on the shoulder surface of the tube of FIG. 1.
Figure 3:
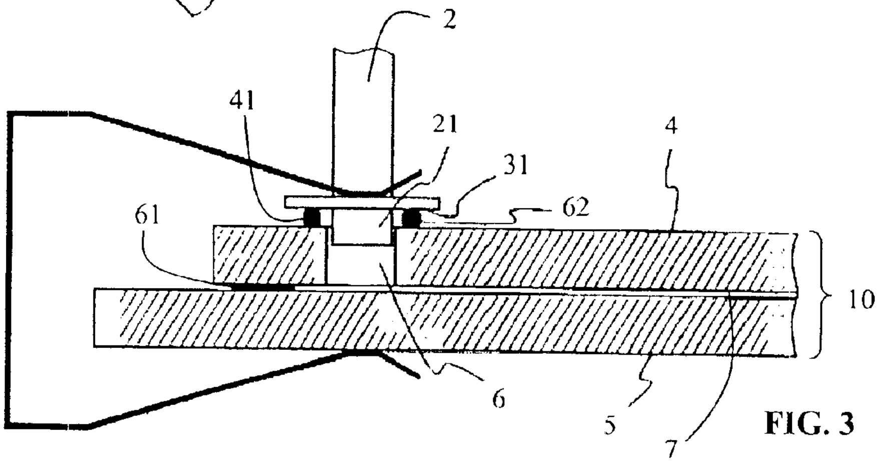
FIG. 3 depicts the fitting of the tube of FIGS. 1 and 2 onto a display comprising two tiles defining a space to be pumped.
Figure 4:
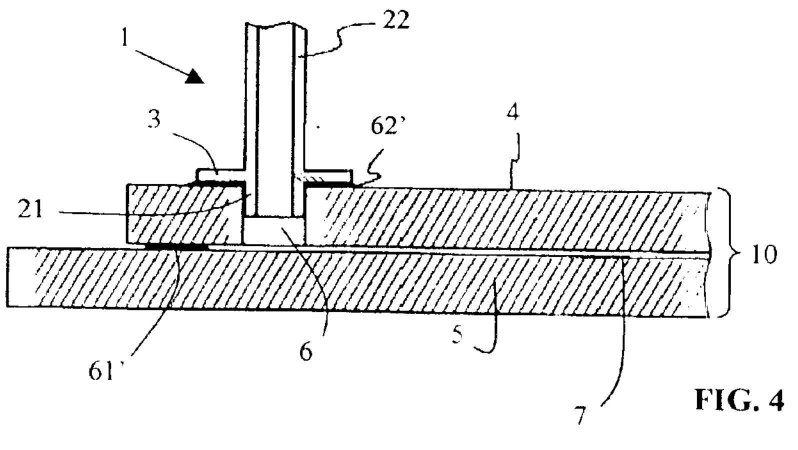
FIG. 4 depicts the panel of FIG. 3 provided with its pumping tube.
Figure 5:
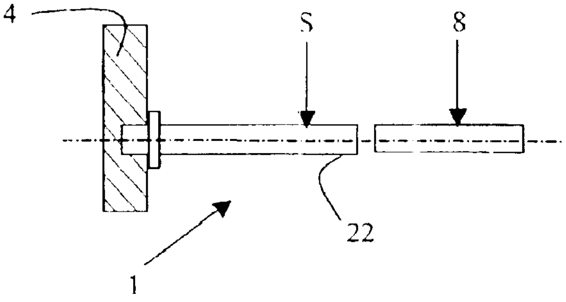
FIGS. 5 and 6 depict two ways of connecting the tube of FIG. 1 to pumping, and where necessary filling, means.
Figure 6:
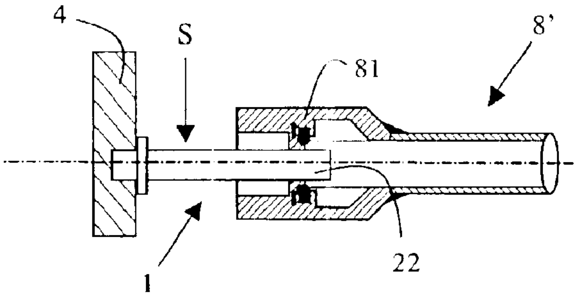
Figure 7:
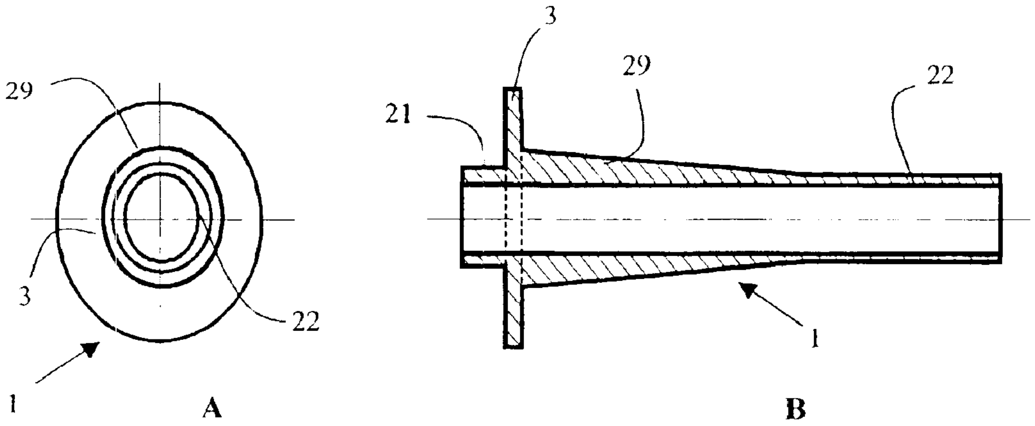
FIG. 7 depicts an embodiment of the pumping tube, made of moulded glass, of FIG. 1 according to the prior art.
Figure 8:
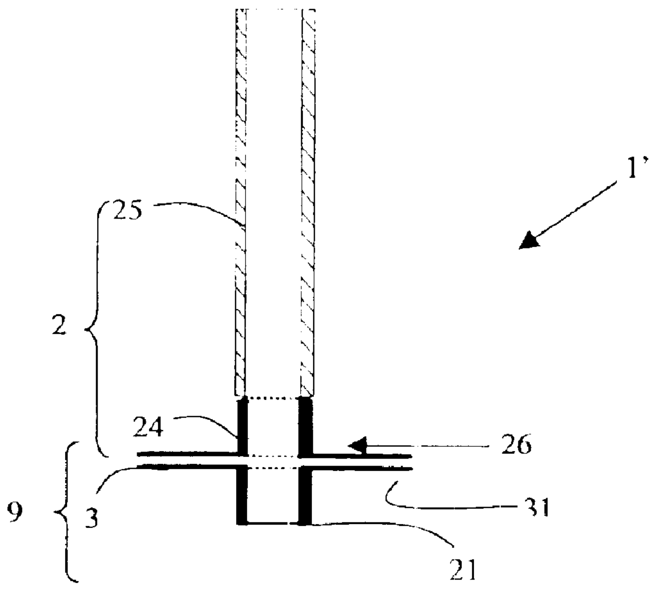
FIG. 8 depicts an embodiment according to the invention of the tube of FIG. 1, comprising a metal end-piece and a glass tube bonded to one of the end of this end-piece.

According to a preferred embodiment shown in FIG. 8, the tube 1' according to the invention comprises a cylindrical pumping pipe 2 and metal shoulder means 3; the cylindrical pumping pipe 2 has a metal upstream portion 24 with its end 21 for fitting into a pumping orifice and a glass downstream portion 25, the two portions being bonded together by a glass-to-metal seal 26; the shoulder means 3 and the metal upstream portion 24 of the pipe 2 form a single metal part, namely the end-piece 9; thus, the pumping tube is also described as comprising a metal end-piece 9 and a glass tube 25, bonded together with a glass-to-metal seal 26, the metal end-piece 9 having shoulder means 3.

The metal end-piece 9 makes it easier for the pumping tube to be handled, positioned and fitted onto a display to be pumped; the glass upstream portion 25 facilitates the sealing operating.

The metal of the metal end-piece 9 must be chosen from metals or metal alloys reputed to be able to form a bond and be compatible with the glass of the glass downstream portion 25 of the pipe 2; as metal, the alloy with the reference DILVER P from Imphy may be used.

Figure 9:
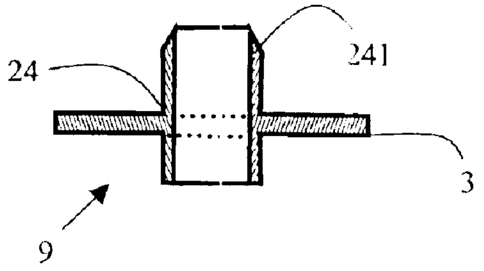
FIGS. 9 to 14 depict embodiments relating to the production of the metal end-piece of the tube according to the invention.
Figure 10:
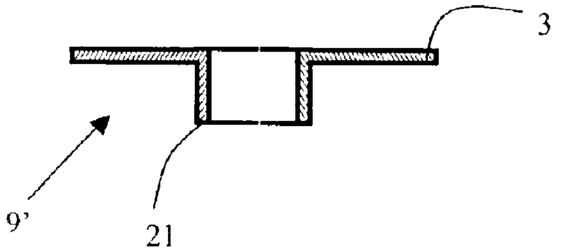
Figure 11:
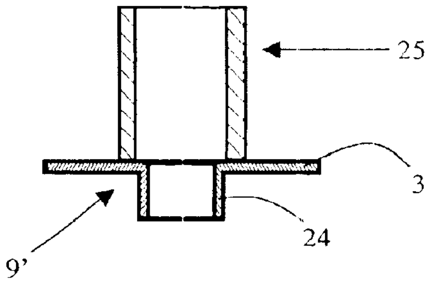
Figure 13:
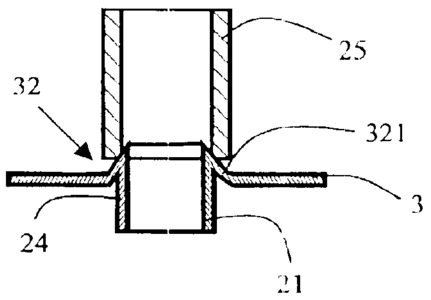
Figure 14:
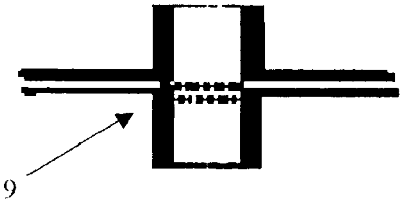

The geometry of the metal end-part may be in two main broad forms:

- a first form in which the metal upstream portion 24 of the pipe 2 extends on either side of the shoulder means, as shown in FIGS. 9 and 14; as shown in FIG. 9, to facilitate glass-to-metal sealing and to make the bond stronger, a chamfer 241 is preferably provided in the cross section of the pipe 24;
- a second form in which the metal upstream portion 24 of the pipe 2 extends only on one side of the fitting end 21, as shown in FIGS. 10, 11 and 13; as shown in FIG. 13, to facilitate the glass-to-metal sealing and to make the bond stronger, a convex circular groove 32 is preferably provided on the shoulder means, the said groove being positioned so that one of its flanks 321 is located level with the glass-to-metal seal 26.

Figure 12:
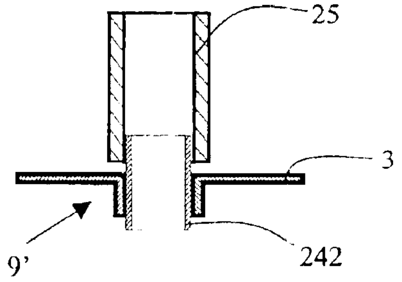

One of the embodiments of the end-piece 9' of FIG. 10 is shown in FIG. 12; according to this embodiment, the metal upstream portion 24 of the pipe 2 includes a cylindrical sleeve 242 onto which the end-piece 9' and one end of the glass downstream portion of the pipe 2 are fitted; thus, a pumping tube providing a very good shear strength is obtained.

The metal end-pieces 9, 9' may be produced by machining, by turning, by punching, by drawing or by other methods of working metal; the choice of the method for manufacturing the end-piece depends on its geometry and on the length of the manufacturing run, drawing in general being reserved for long runs: the end-piece of the first embodiment (FIG. 9) is preferably produced by machining or turning, whereas the end-piece of the second embodiment (especially FIGS. 10 and 11) is preferably produced by punching or drawing a plate so as to form a hole therein, with the edges made to stand up, the upstanding edges of the hole forming the upstream portion 24 of the pipe 2.

FIG. 14 shows an end-piece 9 similar to that of FIG. 9 according to the first embodiment, obtained here by butting together "back to back" the two end-pieces 9' produced by punching or drawing, like the one in FIG. 10; this way of producing an end-piece 9 of the first embodiment may be more economical than machining or turning in the case of long manufacturing runs.

The glass downstream portion 25 of the pipe 2 is formed by a conventional glass tube, like those conventionally used for pumping tubes.

The glass-to-metal seal 26 between the end-piece 9, 9' and this glass downstream portion 25 is produced in a manner known per se, so as to obtain a solid and gas-tight connection.

The pumping tube thus obtained according to the invention is used in a conventional manner for pumping displays, as described above in the prior art; to fit it onto the display, it is advantageous to use automatic handling and positioning machines.

What is claimed is:

1. Tube for pumping, where appropriate for filling, and for sealing a space between two tiles, at least one of which is provided with a pumping orifice, said to be comprising a cylindrical pumping pipe and metal shoulder means for security the pipe on one of the tiles, the cylindrical pipe comprising a metal upstream portion having a part upstream of the metal shoulder means that is fitted into the said orifice and a glass downstream portion, wherein the upstream metal portion and the metal shoulder means form a metal end-piece.

2. Pumping tube according to claim 1, wherein the said metal end-piece is produced by machining or turning.

3. Pumping tube according to claim 1, wherein the said metal end-piece is produced by punching a hole in at least one metal plate, the hole being made by punching, with the edges of the hole being made to stand up so that these edges form, at least in part, the upstream cylindrical portion of the pipe, the at least one metal plate forming the shoulder means.

4. Pumping tube according to claim 1, wherein the said metal end-piece is produced by drawing at least one metal plate so as to form a hole with upstanding edges, forming, at least in part, the upstream cylindrical portion of the pipe, the at least one metal plate forming the shoulder means.

5. Pumping tube according to claim 1, wherein it comprises a metal cylindrical sleeve which extends on each side of the shoulder means, onto which sleeve both the glass downstream portion of the pipe and circular edges of a hole formed in at least one metal plate forming the shoulder means are fitted.

6. Pumping tube according to claim 1, wherein the downstream portion of the pipe is joined to the metal upstream portion of the pipe by a glass-to-metal seal.

7. Pumping tube according to claim 6, wherein, level with the said glass-to-metal seal, the cross section of the cylindrical wall of the upstream portion of the pipe in contact with the glass is chamfered.

8. Pumping tube according to claim 7, wherein the shoulder means comprise a single metal plate onto which a glass end of the downstream portion of the pipe is bonded, circular edges of a hole formed in the metal plate extend upstream of the shoulder means, and the said metal plate has a convex circular groove, one of the flanks of which is located level with the glass-to-metal seal and forms the said chamfer.

9. Display comprising two flat tiles defining between them a space at least one of which is provided with a pumping orifice into which a pumping tube is fitted according to claim 1 so that a surface of the metal shoulder means of the tube is applied against that external surface of the tile which is located around the periphery of the pumping orifice.

10. Display according to claim 9, wherein it includes a seal between the shoulder surface and the said external surface.

11. Display according to claim 9, wherein the said pumping tube is sealed at the glass end.

12. Plasma display according to claim 9.

13. Field emission display according to claim 9.

* * * * *